United States Patent [19]
Healy

[11] Patent Number: 6,123,761
[45] Date of Patent: Sep. 26, 2000

[54] PIGMENT COMPOSITIONS CONTAINING SUBSTITUTED AMIDO PHTHALOCYANINE DERIVATIVES

[75] Inventor: Thomas Healy, Paisley, United Kingdom

[73] Assignee: Ciba Specialty Chemicals Corporation, Tarrytown, N.Y.

[21] Appl. No.: 09/376,460

[22] Filed: Aug. 18, 1999

[30] Foreign Application Priority Data

Aug. 29, 1998 [GB] United Kingdom ............... 9818824

[51] Int. Cl.⁷ .................................. C09B 67/00
[52] U.S. Cl. ................... 106/410; 106/411; 106/493; 106/494; 106/495; 106/496; 106/497; 106/498
[58] Field of Search ................... 106/410, 411, 106/493, 494, 495, 496, 497, 498

[56] References Cited

U.S. PATENT DOCUMENTS 5,250,111  10/1993  Langley et al. ............... 106/411
5,296,034  3/1994  Dietz et al. .................. 106/412

FOREIGN PATENT DOCUMENTS 0 398 620  11/1990  European Pat. Off. .
0 519 395  12/1992  European Pat. Off. .
0 629 668  12/1994  European Pat. Off. .
1 502 884  3/1978  United Kingdom .

OTHER PUBLICATIONS

6001 Chemical Abstracts, vol. 114,(1991) 20–05 No. 20 No. 20 No. 114:187659j of CS–263 108 (no month).
Chem. Abst. 79:32697 of DE 2,256,544 (May 1973).

Primary Examiner—Anthony Green
Attorney, Agent, or Firm—David R. Crichton

[57] ABSTRACT

A pigment composition comprising pigment and an amido phthalocyanine compound having the general formula I:

$$MPc-(CONR^1R^2)_n \qquad I$$

wherein which Pc is a phthalocyanine ring which is optionally further substituted by up to an average of one chlorine or bromine atom or of a sulphonic acid; M is hydrogen or a metal such as Mg, Al, Ni, Fe, Zn, Pb, Sn or Cu: n is a number ranging from 0.1 to 4.0; $R^1$ and $R^2$ are independently selected from hydrogen, $C_1$–$C_{20}$ alkyl, $C_5$–$C_{12}$ cycloalkyl, $C_7$–$C_{12}$ aralkyl, $C_6$–$C_{10}$ aryl, $C_4$–$C_6$ alkyl amino alkyl, $C_2$–$C_{20}$ aliphatic amine, $C_2$–$C_{20}$ aliphatic amine acid salt, $C_2$–$C_{20}$ alcohol, polyoxyalkylene, polyoxyalkylene amine.

17 Claims, No Drawings

PIGMENT COMPOSITIONS CONTAINING SUBSTITUTED AMIDO PHTHALOCYANINE DERIVATIVES

TECHNICAL FIELD.

The present invention relates to novel compositions suitable for use as coatings comprising a) pigment and b) substituted amido phthalocyanines. The novel compositions are valuable for the delivery of excellent flow (non-flocculating) properties in ink and paint coatings as well as excellent heat stabilizing properties in thermoplastic resins.

BACKGROUND

The use of phthalocyanine (Pc) derivatives in pigment compositions is known. Typically phthalocyanine derivatives can be utilised in surface coating compositions such as inks, paints and plastics to impart improved flow behaviour (reduced flocculation); dispersibility; heat stability and the like.

GB949739 describes the use of non flocculating phthalocyanine preparations which contain as the relevant stabilising agent, substituted amino methyl phthalocyanine compounds having the formula:

in which Pc is an m-valent phthalocyanine residue; $R^1$ and $R^2$, independently, are hydrogen or an optionally substituted aliphatic residue, or the group—$NR^1R^2$ is a heterocyclic residue, and m is 1,2,3 or 4.

In GB2009205, phthalocyanine compositions are disclosed comprising a) a phthalocyanine pigment b) a substituted amino methyl amido methyl phthalocyanine compound having the formula:

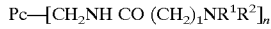

in which Pc is the n-valent residue of a metal free or metal phthalocyanine; $R^1$ is hydrogen alkyl, cycloalkyl, hydroxyalkyl, amino alkyl or aralkyl; $R^2$ is alkyl, cycloalkyl, hydroxyalkyl, amino alkyl or aralkyl; or R1 and R2 may be combined, with N-atom to form a 5- 6- or 7 membered heterocyclic ring; I is 1, 2, 3, or 4 and n is 1, 2, 3, 4, 5, 6, 7 or 8; and c) a polyvalent metal salt of an anionic surface active agent.

In EP 0087713 there are described phthalocyanine preparations, having improved colouristic properties and improved technical properties in application, comprising a) a finely diveded phthalocyanine pigment; and b) a quaternised amino alkyl amido methyl phthalocyanine compound having the formula:

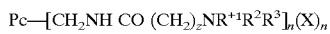

in which Pc is an n-valent phthalocyanine residue, optionally containing up to two chlorine atoms; $R_1$ and $R_2$ independently, are $C_2$–$C_6$ alkyl or $C_2$–$C_4$ hydroxyalkyl; $R_3$ is $C_1$–$C_{14}$ alkyl, $C_2$–$C_4$ hydroxyalkyl, 2-hydroxy-3-chlorpropyl or benzyl; X is one equivalent of an anion; z is 1 or 2; and n is 1,2,3 or 4.

In GB695523, imido methyl and amido methyl phthalocyanine pigments are produced by reacting phthalocyanines with a hydroxymethylimide of formula:

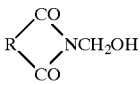

in which R is a divalent radical, eg. methylene or a o-phenylene, resulting in the introduction, into the phthalocyanine molecule, of groups of formula:

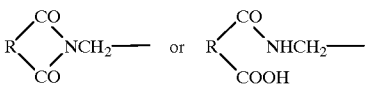

in which R has its previous significance.

In EP 508 704 there are described substituted amido methyl derivatives having the formula B:

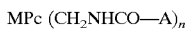

in which M is hydrogen or a metal; Pc represents a phthalocyanine residue which is optionally further substituted by up to an average of one chlorine or bromine atom or of a sulphonic acid; n is a number ranging from 0.1 to 4.0, and A is $C_3$–$C_{21}$ alkenyl, $C_5$–$C_8$ cycloalkyl, $C_7$–$C_{11}$ aralkyl, $C_6$–$C_{10}$ aryl, a 5- or 6-membered heterocyclic residue or a fused heterocyclic system. These are formed by the reaction of an acid chloride with the aminomethyl phthalocyanine.

The present invention relates to pigment compositions comprising a) a pigment and b) an amido phthalocyanine compound having the general formula I:

in which Pc is a phthalocyanine ring which is optionally further substituted by up to an average of one chlorine or bromine atom or of a sulphonic acid, but which is preferably not further substituted; M is hydrogen or a metal such as Mg, Al, Ni, Fe, Zn, Pb, Sn or preferably, Cu capable of forming a metal phthalocyanine: n is a number ranging from 0.1 to 4.0, preferably from 1.0 to 3.0; $R^1$ and R2 are independently selected from hydrogen, $C_1$–$C_{20}$ alkyl, $C_5$–$C_{12}$ cycloalkyl, $C_7$–$C_{12}$ aralkyl, $C_6$–$C_{10}$ aryl, $C_4$–$C_6$ alkyl amino alkyl, $C_2$–$C_{20}$ aliphatic amine, $C_2$–$C_{20}$ aliphatic amine acid salt, $C_2$–$C_{20}$ alcohol, polyoxyalkylene, polyoxyalkylene amine.

The phthalocyanine compound b) can be readily synthesised by heating the carboxamide of phthalocyanine in the precense of amine acid /acid salts thus yielding substituted amido phthalocyanines of high purity. The novel process for the preparation of the phthalocyanine compound is the subject of a co-pending patent application. The amine/acid salts are denoted by formula II:

Wherein R and $R^1$ can be independently selected from the groups previously stated by formula 1, Z is the hydrochloride or the hydrogen sulphate salt of the amine.

It is an object of this present invention is to describe and propose several pigment compositions which are based on the synthesised derivatives defined by formula I. It is a further object of the present invention to provide coatings compositions such as ink, paint and plastics comprising the substituted amido phthalocyanine pigment compositions. The particular substituted amido phthalocyanine pigment compositions according to the present invention are valuable for the delivery of excellent flow (non-flocculating) properties of ink and paint coatings as well as excellent heat stabalizing properties in thermoplastic resins.

SUMMARY OF THE INVENTION.

Accordingly, the present invention provides pigment compositions comprising of a) pigment and b) amido phthalocyanine derivative represented by general Formula I:

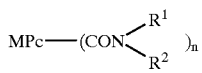

I in which Pc is a phthalocyanine ring which is optionally further substituted by up to an average of one chlorine or bromine atom or of a sulphonic acid, but which is preferably not further substituted; M is hydrogen or a metal eg. Mg, Al, Ni, Fe, Zn, Pb, Sn or preferably, Cu capable of forming a metal phthalocyanine: n is a number ranging from 0.1 to 4.0, preferably from 1.0 to 3.0; $R^1$ and $R^2$ are independently selected from hydrogen, $C_1$–$C_{20}$ alkyl, $C_5$–$C_{12}$ cycloalkyl, $C_7$–$C_{12}$ aralkyl, $C_6$–$C_{10}$ aryl, $C_4$–$C_6$ alkyl amino alkyl, $C_2$–$C_{20}$ aliphatic amine, $C_2$–$C_{20}$ aliphatic amine acid salt, $C_2$–$C_{20}$ alcohol, polyoxyalkylene, polyoxyalkylene amine.

DESCRIPTION.

The compositions according to the present invention include, as an essential feature an amido phthalocyanine of general formula I:

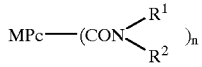

I wherein as stated $R^1$ and $R^2$ are independently selected from hydrogen, $C_1$–$C_{20}$ alkyl, $C_5$–$C_{12}$ cycloalkyl, $C_7$–$C_{12}$ aralkyl, $C_6$–$C_{10}$ aryl, $C_4$–$C_6$ alkyl amino alkyl, $C_2$–$C_{20}$ aliphatic amine, $C_2$–$C_{20}$ aliphatic amine acid salt, $C_2$–$C_{20}$ alcohol, polyoxyalkylene, polyoxyalkylene amine.

Examples of $C_1$–$C_{20}$ alkyl groups suitable for use herein include: methyl, propyl, butyl, hexyl, heptyl, dodecyl, hexcadecyl, octadecyl, tert-butyl, oleyl. Preferred alkyl groups $R^1 R^2$ are when $R^1$=Hydrogen and $R^2$ is dodecyl, octadecyl, hexadecyl and oleyl.

Examples of $C_5$–$C_{12}$ cyclo alkyl groups suitable for use herein include: cyclopentyl, cyclohexyl and cyclo-octyl, cyclohexyl being preferred when $R^1$=Hydrogen.

Examples of $C_7$–$C_{12}$ Aralkyl groups suitable for use herein include: benzyl or naphthylmethyl, benzyl being preferred when $R^1$=Hydrogen.

Examples of $C_6$–$C_{10}$ Aryl groups suitable for use herein include: phenyl or napthyl, with a preference for phenyl when $R^1$=Hydrogen.

Examples of $C_4$–$C_6$ alkyl amino alkyl groups suitable for use herein include: dimethylaminoethyl, dimethylaminopropyl, diethylaminopropylamine, dimethylaminopropyl being preffered when $R^1$=Hydrogen.

Examples of $C_2$–$C_{20}$ aliphatic amine groups suitable for use herein include: amino ethyl, amino propyl, amino butyl, amino pentyl, amino hexyl, amino heptyl, amino dodecyl amino-octyl. Preferred aliphatic amines are amino hexyl, amino heptyl, amino dodecyl and amino-octyl when $R^1$=hydrogen.

Examples of the aliphatic amine acid salt groups suitable for use herein are as specified above however as the hydrochloride or the hydrogen sulphate. The preferred amine salts being the hydrochloride amino heptyl, amino dodecyl and amino-octyl when $R^1$=Hydrogen.

Examples of $C_2$ to $C_{20}$ alcohol groups suitable for use herein include: 2-hydroxyethyl, 2-hydroxy-1,1 dimethylethyl, 3 hydroxy-2,2-dimethyl propyl, 1 hydroxy hexyl, 1 hydroxy propyl, 1 hydroxy pentyl. Preferred groups being 2 hydroxy propyl, 1 hydroxy hexyl and 1 hydroxy pentyl when $R^1$=Hydrogen Polyoxyalkylene groups suitable for use herein have the general structure:

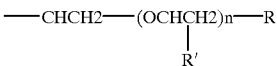

wherein R=methyl and R can be hydrogen or methyl depending on whether ethylene oxide or propylene oxide has been used in polymerisation reaction.

Suitable polyoxyalkylene groups include polyoxyalkylene amines having the general structure:

These materials, known as the Jeffamine Series of compounds are available from the Texaco Chemical Company under the trade names Jeffamine M89 (RTM)—Jeffamine M2070(RTM) defining mono amines and Jeffamine EDR 148 (RTM)—Jeffamine D400 (RTM) defining diamines.

The cyclic substituents $R^1, R^2$ namely the cylo-alkyl, aralkyl and aryl substituents may contain one or more substituent groups. Examples of suitable substituents include $C_1$–$C_8$ alkyl groups, such as methyl, ethyl, n-propyl, n-butyl and n-hexyl; $C_1$–$C_6$ alkoxy groups such as methoxy, ethoxy, n-propoxy, n-butoxy and n-hexoxy groups; hydroxy groups; nitro groups; and halogeno groups such as chloro, bromo and iodo groups.

The compositions according to the present invention include as a further essential feature a pigment. Any pigment having a tendency to flocculate may be employed as the pigmentary part of the composition herein. Suitable pigments for use herein include azo, anthraquinone, quinaccridone, isoindolinone, dioxine or perylene pigment and mixtures thereof. Examples of suitable pigments are Pigment Red 57, Pigment Red 177, Pigment Violet 19, Pigment Yellow 110 and Pigment Violet 23. Phthalocyanine pigment are preferred for use herein. The phthalocyanine pigments may optionally be susbstituted such with halogens or metals, for example chlorinated, metal-containing phthalocyanine pigment. Highly preferred for use herein are unsubstituted copper phthalocyanine pigments.

The amount of the compound of formula I, present in the pigment compositions of the present invention, conveniently ranges from 0.5 to 20, preferably from 1.0 to 10 parts by weight, based on the pigment component. Compounds of formula I may be combined with the pigment component of the composition of the invention, during any stage of processing of the pigment component, or may be combined at the formulation stage of the application chosen.

For example, the processing or conversion of a crude base phthalocyanine into pigmentary form, may be effected by mixing the crude phthalocyanine with compounds of formula I, and milling the mixture. In a second method of producing a pigmentary phthalocyanine, a base phthalocyanine component may be milled or acid pasted and treated with a polar organic solvent eg. isopropanol, which is at least partially water miscible. In a third method a base phthalocyanine may be kneaded in the presence of a grinding salt and a polar solvent eg diethylene glycol. Compounds of formula I may be incorporated at any stage during processing. Another method of incorporation is to dry blend the compounds of formula I with the pigment component, or simply add the compounds of formula I to the formulation of the chosen application.

The pigment compositions of the present invention may also contain minor amounts eg. up to 5% by weight, based on the total pigment composition, of conventional pigment additives eg. natural rosins such as hydrogenated rosin, disproportionated rosin and dimerised rosin, as well as esters of rosin acids such as abietic acid. Examples of such rosins include Staybelite resin available from Hercules, Recoldis A resin available from Langley Smith and Dymerex resin available from Hercules.

Compounds denoted by formula I can be incorporated into pigment components to produce pigment compositions which are particularly suitable for use in the colouration of surface coating media, in particular printing inks and paints, to which they can impart excellent flow (non-flocculating) behaviour. Compounds denoted by formula I can also impart excellent heat stabilizing properties to pigments used in thermoplastic resin compositions.

The following non-limiting examples illustrate the compositions according to the present invention.

EXAMPLE 1

A. Preparation of Mono Propylamido Copper Phthalocyanine 5g of copper phthalocyanine mono carboxamide (88% Pure) and 10g of propylamine hydrochloride were mixed well manually and heated to 280° C. for 2 hour using an iso-mantle. Reaction mixture was allowed to cool to 60° C. and reslurried by addition of water at 80° C., filtration of the slurry and further washing with 80° C. water was carried out to remove excess amine hydrochloride. The filtered washed product was dried at 70° C. in an oven to give 4.52g of mono propylamido copper phthalocyanine.

The FTIR spectrum of the CuPc carboxamide starting material and that of the final product are clearly different. Very strong peaks appear at 2900 cm$^{-1}$ and 2850 cm$^{-1}$ in the propylamido CuPc but not in that of the CuPc monocarboxamide. This is strong evidence for, and very characteristic of alkyl stretching activity which can be associated with the propyl group.

B. Preparation of Pigment Composition 5.6 g of the product from 1A and 71 g of copper phthalocyanine are dry milled together in a Vibroatom 0.6 litre mill pot containing 2315 g of 1.27 cm steel balls and 530 g roofing tacks, for 3 hours and 51 minutes. The pigment powder was then discharged through an Endecotts sieve pan.

C. Preparation of Ink.

To Prepare,

| Mixed resinate - Calcium/Zinc resinate | 64 g |
|---|---|
| Toluene | 18 g |
| Pigment powder from 1B | 18 g |
| Glass beads (2 mm diameter) | 300 g | are charged to a 250ml beadmill pot and beadmilled for 30 mins at 200 rpm with water cooling to keep at room temperature. Millbase is discharged and let down using the following let down vehicle:

| Mixed resinate - Calcium/Zinc resinate | 100 g |
|---|---|
| Toluene | 60 g |

A 1:1 ratio of millbase and let down vehicle are blended and shaken before filling an efflux cup and measuring in seconds the discharge rate of the ink from the cup. The resultant ink exhibits improved flow compared to example 4. Table I

EXAMPLE 2

A. Preparation of Dodecylamido Copper Phthalocyanine 19.4g of dodecylamine was placed in a round bottom flask and hydrochloride gas bubbled continuously through the amine for about 1 hour with gentle heat about 50° C. to form dodecylamine hydrochloride. 5g of CuPc monocarboxamide was then added and thoroughly mixed together manually. The mixture was heated to 280° C. and held for 2 hours. The reaction mixture was allowed to cool to room temperature then re-slurried in a minimum quantity of chloroform, and added slowly portionwise to approx 400mls of ethanol with stirring. Filtration and washing with ethanol was carried out and the product dried at 70° C. in an oven to give 4.69g mono dodecylamido CuPc.

The FITR Spectrum of the CuPc carboxamide and the final product are clearly different. Very strong peaks appear at 2900 cm$^{-1}$ and 2850 cm$^{-1}$ in the dodecylamido CuPc but not in that of the CuPc monocarboxamide. This is strong evidence for, and very characteristic of alkyl stretching activity which can be associated with the dodecyl group.

MALDI-TOF mass spectra of the CuPc carboxamide and the final product are also clearly different. In the final product the mass spectra clearly shows the presence of mono dodecyl amido CuPc by an intense peak at 790 m/z. The starting material has no corresponding peaks at this mass to charge ratios.

B. Preparation of Pigment Composition 5.6 g of product from 2A is dry milled with copper phthalocyanine according to the method described in 1B.

C. Preparation of Ink.

The resultant ink from 2B when assessed according to procedure 1C exhibits improved flow compared to example 4. Table I

EXAMPLE 3

A. Preparation of Octadecylamido Cooper Phthalocyanine 5g of copper phthalocyanine mono carboxamide 88% Pure and 32g of octadecylamine hydrochloride are mixed well manually and heated to 280° C. for 2 hours using an isomantle. Reaction mixture was allowed to cool to room temperature and the product isolated as for Example 2A, to give 4.91g mono octadecylamido CuPc.

FTIR spectra of starting material and final product were clearly different with very strong peaks at 2900 cm$^{-1}$ and 2850 cm$^{-1}$ for the final product, but not in the case of the CuPc carboxamide. This is strong evidence, and characteristic of alkyl stretching activity associated with the octadecyl group. Maldi-toff mass spectra of the final product highlights an intense peak at 874 m/z which represents mono octadecylamido CuPc. The starting material has no corresponding peaks at this mass to charge (m/z) ratio.

B. Preparation of Pigment Composition 5.6 g of product from 2A is dry milled with copper phthalocyanine according to the method described in 1B.

C. Preparation of Ink.

The resultant ink from 2B when assessed according to procedure 1C exhibits improved flow compared to example 4. Table I

EXAMPLE 4

Comparative Example.

A. Preparation of Pigment Composition 71 g of copper phthalocyanine is dry milled in the absence of any amido phthalocyanine derivatives according to method 1B.

B. Preparation of Ink.

The resultant ink from 4A when assessed according to procedure 1C exhibits very poor flow. Table I.

EXAMPLE 5

A. Preparation of Pigment Composition Containing Mono Propylamido Copper Phthalocyanine To an aqueos slurry of 20 g of beta form copper phthalocyanine in 165 g of water is added 2g of product from Example 1A The resultant mixture is stirred using a paddle stirrer for 1 hour at 55° C. The slurry is then filtered and washed with room temperature water then dried at 70° C. in an oven. Yield is 21.8 g of product, which is sieved through a 150 micron screen.

B. Preparation of Paint

Dispersion.

To a 200 ml snap cap glass jar the following were added:

| | |
|---|---|
| Glass beads 2 mm diameter | 100 g |
| Pigment from 5A. | 4.8 g |
| Setal (RTM) short oil alkyd resin | 20.12 g |
| Setamine (RTM) melamine/formaldehyde resin | 7.81 g |
| Solvesso 100 (RTM) distilled aromatic based solvent | 10.98 g |
| n-Butanol | 1.88 g |
| Butylglycolacetate | 1.54 g |
| Anti float agent 2% solids in Solvesso 100 (RTM) | 0.86 g |

The resultant mixture was shaken by hand for 1 minute, then shaken for 1 hour on the skandex disperser to disperse the pigment. The dispersion is then strained through a cone shaped sieve to remove the beads. The dispersion was collected and sealed in a sample bottle and placed in a waterbath at room temperature for 1 hour. After 1 hour the dispersion was removed from the waterbath and the rheology was measured using a Brookfield Viscometer set at speed 12 r.p.m. and using a number 3 spindle. A comparison of the instrumental rheology measurement was made against comparative example 8. Table II To assess dispersibility/colouring strength and flocculation resistance the dispersion was further reduced using a white base which had the following composition:

White Base.

| | |
|---|---|
| Kronos 2310 (RTM) Titanium dioxide | 20% |
| Setal (RTM) | 45.29% |
| Setamine (RTM) | 16.62% |
| Solvesso 100 (RTM) | 9.0% |
| n-Butanol | 3.31% |
| Xylene | 2.25% |
| Butylglcolacetate | 2.04% |
| Anti float agent 2% solids in Solvesso 100 (RTM) | 1.18% |
| Aerosil 200 (RTM) high surface area extender | 0.32% |

White reduction was prepared in a 60 ml sample jar as follows:

Dispersion 4.0g
White base 20.0g

The resultant mixture was shaken by hand for 1 minute, then shaken using the skandex for 0 mins. The reduced dispersion was then sprayed onto astralux card (gloss coated card) and the solvent allowed to flash off at room temperature for 30 minutes before stoving in an oven at 100° C. for 30 mins. Once dried a small amount of reduced dispersion was drawndown over the sprayed portion using a number 5 K-Bar representing low shear application, in accordance with standard paint industry practice.

A spectrophotometric assessment was then made of the flocculation level between the sprayed portion and the drawndown portion, and a comparison made against the level of flocculation in the comparative example 8. An assessment of the dispersibility/colouring strength was also carried out against comparative example 8 using spectrophotometric techniques. Table II.

EXAMPLE 6

A. Preparation of Pigment Composition Containing Dodecylamido Copper Phthalocyanine 2.0g of product from 2A was mixed with beta form copper phthalocyanine as described in 5A. Yield was 21.7 g B. Preparation of Paint Preparation of paint dispersion and white reduction was carried out as described in 5B using product obtained in 6A. Rheology, flocculation and dispersibility/colouring strength was also assessed as described in 5B. Table II

EXAMPLE 7

A. Preparation of Pigment Composition Containing Octadecylamido Copper Phthalocyanine 2.0g of product from 3A was mixed with beta form copper phthalocyanine as described in 5A. Yield was 21.8 g.

B. Preparation of Paint

Preparation of paint dispersion and white reduction was carried out as described in 5B using product obtained in 7A. Rheology, flocculation and dispersibility/colouring strength was also assessed as described in 5B. Table II

EXAMPLE 8

Comparative Example

A. Preparation of Pigment Composition

An aqueous slurry of 20 g of beta form copper phthalocyanine in 165 g of water is stirred using a paddle stirrer for 1 hour at 55° C. The slurry is then filtered and washed with room temperature water then dried at 70° C. in an oven. Yield is 20.0 g of product, which is sieved through a 150 micron screen.

B. Preparation of Paint

Preparation of paint dispersion and white reduction was carried out as described in 5B using product obtained in 8A. Rheology, flocculation and dispersibility/colouring strength was also assessed as described in 5B. Table II.

TABLE I

| Examples | Time in seconds for efflux cup discharge |
|---|---|
| 1 | 67 |
| 2 | 85 |
| 3 | 97 |
| 4 | 122 |

Table I shows the advantage in flow behaviour of a liquid ink system when the substituted amido copper phthalocyanine derivatives are incorporated into suitable pigment compositions.

TABLE II

| Examples | Rheology | Dispersibility/ Colouring strength | Flocculation |
|---|---|---|---|
| 5 | Moderately superior | Slight - moderately superior | Slightly superior |
| 6 | Extremely superior | Moderately superior | Slightly superior |
| 7 | Moderately superior | Slightly superior | Very slightly superior |
| 8 | Control | Control | Control |

Table II shows the advantages in flow, dispersibility and flocculation behaviour of a Setal/Setamine paint system when the substituted amido copper phthalocyanine derivatives are incorporated into suitable pigment compositions.

EXAMPLE 9

A. Preparation of Pigment Composition Containing Octadecylamido Copper Phthalocyanine To an aqueous slurry of 20 g of alpha form copper phthalocyanine in 165 g of water is added 3g of product from Example 3A. The resultant mixture is stirred using a paddle stirrer for 1 hour at 55° C. The slurry is then filtered and washed with room temperature water then dried at 70° C. in an oven. Yield is 22.9 g of product, which is sieved through a 150 micron screen.

B. Dispersion of Composition in Plastic.

Onto a two roll-mill with rollers set at 150° C. and 110° C., is introduced high density polyethylene (100 parts) this is mixed with pigment (0.1 parts) and titanium dioxide (1 part). The mixture is milled on a two roll-mill and then injection moulding. The resulting moulding is stable to heat at 300° C. for a dwell time of 5 minutes before a colour change occurs compared with a standard moulding heated for 12 seconds at 200° C.

EXAMPLE 10

Comparative Example

B. Preparation of Pigment Composition

An aqueous slurry of 20 g of alpha form copper phthalocyanine in 165 g of water is stirred using a paddle stirrer for 1 hour at 55° C. The slurry is then filtered and washed with room temperature water then dried at 70° C. in an oven. Yield is 19.9 g of product, which is sieved through a 150 micron screen.

B. Dispersion of Composition in Plastic.

Dispersion and assessment in high density polyethylene of the pigment composition prepared in 10A is carried out as for example 9B. The resulting moulding is stable to heat at 200° C. for a dwell time of 5 minutes before a colour change occurs compared with a standard moulding heated for 12 seconds at 200° C.

What is claimed is:

1. A pigment composition comprising a tinctorially effective amount of an azo, anthraquinone, quinacridone, isoindolinone, dioxine or perylene pigment and an effective flow control or heat stabilizing amount of a compound of formula (I):

$$MPc-(CONR^1R^2)_n \qquad I$$

wherein:

Pc is a phthalocyanine ring which is optionally further substituted by up to an average of one chlorine or bromine atom or of a sulphonic acid;

M is hydrogen or a metal;

n is a number ranging from 0.1 to 4.0;

$R^1$ and $R^2$ are independently from one another hydrogen, $C_1$–$C_{20}$ alkyl, $C_5$–$C_{12}$ cycloalkyl, $C_7$–$C_{12}$ aralkyl, $C_6$–$C_{10}$ aryl, $C_4$–$C_6$ alkyl amino alkyl, aliphatic amino-$C_2$–$C_{20}$ alkyl or an acid salt thereof hydroxy-$C_2$–$C_{20}$ alkyl or a polyoxyalkylenyl or amino-polyoxyalkenyl group.

2. A pigment composition according to claim 1 wherein Pc is an unsubstituted phthalocyanine ring; M is Cu and n is a number ranging from 1.0 to 3.0.

3. A pigment composition according to claim 1 wherein $R^1$ and $R^2$ are independently from one another methyl, propyl, butyl, hexyl, heptyl, dodecyl, hexadecyl, octadecyl, tert-butyl or oleyl.

4. A pigment composition according to claim 1 wherein $R^1$ is hydrogen and $R^2$ is cyclohexyl, phenyl, benzyl, dodecyl, octadecyl, hexadecyl or oleyl.

5. A pigment composition according to claim 1 wherein $R^1$ and $R^2$ are independently from one another cyclopentyl, cyclohexyl or cyclooctyl.

6. A pigment composition according to claim 1 wherein $R^1$ and $R^2$ are independently from one another benzyl or naphthylmethyl.

7. A pigment composition according to claim 1 wherein $R^1$ and $R^2$ are independently from one another 2-hydroxyethyl, 2-hydroxy-1,1-dimethylethyl, 3-hydroxy-2,2-dimethyl propyl, 1-hydroxy hexyl, 1-hydroxy propyl or 1-hydroxy pentyl.

8. A pigment composition according to claim 1 wherein $R^1$ and $R^2$ are independently from one another phenyl or napthyl.

9. A pigment composition according to claim 1 wherein $R^1$ and $R^2$ are independently from one another dimethylaminoethyl, dimethylaminopropyl, diethylaminopropylamine.

10. A pigment composition according to claim 1 wherein $R^1$ and $R^2$ are independently from one another

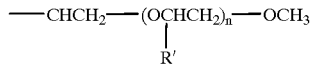

wherein R is hydrogen or methyl.

11. A pigment composition according to claim 1 wherein $R^1$ and $R^2$ are —$CH_2CH_2OCH_2CH_2OCH_2CH_2$—$NH_2$.

12. A pigment composition according to claim 1 wherein $R^1$ and $R^2$ are independently from one another amino ethyl, amino propyl, amino butyl, amino pentyl, amino hexyl, amino heptyl or amino dodecylamino-octyl.

13. A pigment composition according to claim 1 wherein said compound of formula I is comprised in an amount of from about 0.5 to about 20 parts by weight, based on the weight of the pigment in the composition.

14. A pigment composition according to claim 1 wherein M is Mg, Al, Ni, Fe, Zn, Pb, Sn or Cu.

15. A pigment composition according to claim 1 wherein $R^1$ is hydrogen and $R^2$ is 2-hydroxy propyl, 1-hydroxy hexyl, 1-hydroxy pentyl, dimethylaminopropyl, amino hexyl, amino heptyl, amino dodecyl or amino octyl.

16. A pigment composition according to claim 13 wherein the level of said compound of formula I is from about 1.0 to about 10 parts by weight of the pigment component.

17. A printing ink, paint or thermoplastic resin composition comprising a tinctorially effective amount of a pigment composition according to claim 1.

* * * * *